US008847878B2

(12) United States Patent
Kerr et al.

(10) Patent No.: US 8,847,878 B2
(45) Date of Patent: Sep. 30, 2014

(54) ENVIRONMENT SENSITIVE DISPLAY TAGS

(75) Inventors: Duncan Kerr, San Francisco, CA (US); Nicholas King, San Jose, CA (US); B. Michael Victor, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 1359 days.

(21) Appl. No.: 12/615,725

(22) Filed: Nov. 10, 2009

(65) Prior Publication Data

US 2011/0109538 A1 May 12, 2011

(51) Int. Cl.

| | |
|---|---|
| ***G09G 5/00*** | (2006.01) |
| ***G09G 5/02*** | (2006.01) |
| ***G06F 3/00*** | (2006.01) |
| ***G06F 3/14*** | (2006.01) |
| ***G09G 5/36*** | (2006.01) |

(52) U.S. Cl.

CPC ............ *G09G 5/36* (2013.01); *G09G 2320/046* (2013.01); *G09G 2360/144* (2013.01); *G09G 2380/00* (2013.01); *G09G 2330/022* (2013.01)

USPC ............ 345/156; 345/589; 715/745; 715/863

(58) Field of Classification Search

USPC .................................................. 345/163–178

See application file for complete search history.

(56) References Cited

U.S. PATENT DOCUMENTS

| | | | | |
|---|---|---|---|---|
| 2005/0060670 | A1* | 3/2005 | Inui et al. | 715/867 |
| 2008/0001951 | A1 | 1/2008 | Marks et al. | |
| 2008/0026798 | A1 | 1/2008 | Kim | |
| 2009/0076627 | A1* | 3/2009 | Hunt et al. | 700/1 |
| 2009/0197635 | A1* | 8/2009 | Kim et al. | 455/550.1 |
| 2009/0198823 | A1* | 8/2009 | Bannister et al. | 709/230 |
| 2009/0241049 | A1 | 9/2009 | Bates et al. | |
| 2010/0138766 | A1* | 6/2010 | Nakajima | 715/767 |

FOREIGN PATENT DOCUMENTS

EP 1396984 A1 10/2004

OTHER PUBLICATIONS

Pulsar: Interactive Particle System, Jan. 13, 2009 "http://www.creativeapplications.net/iphone/10-creative-ways-to-use-the-accelerometer-iphone/".*

* cited by examiner

*Primary Examiner* — Vijay Shankar
*Assistant Examiner* — Amit Chatly

(57) ABSTRACT

This is directed to dynamic tags or screen savers for display on an electronic device. The tags can include several dynamic elements that move across the display. The particular characteristics of the elements can be controlled in part by the output of one or more sensors detecting the environment of the device. For example, the color scheme used for a tag can be selected based on the colors of an image captured by a camera, and the orientation of the movement can be selected from the output of a motion sensing component. The tag can adjust automatically based on the sensor outputs to provide an aesthetically pleasing display that a user can use as an fashion accessory.

6 Claims, 7 Drawing Sheets

ENVIRONMENT SENSITIVE DISPLAY TAGS

BACKGROUND OF THE INVENTION

An electronic device can include a display for providing information to a user. When the display is not in use, the electronic device can typically turn off the display circuitry to limit the power consumption of the device. The resulting display window may not have much aesthetic appeal, and may not display any information of use to the user.

In some cases, however, the electronic device can include a screen saver to display when the display is not in use. For example, the electronic device can display a screen saver after a timeout has lapsed without receiving any user interaction with the device. As another example, the electronic device can display a screen saver in response to a user locking or logging out of the device. The screen saver can include any suitable information or content to be displayed. For example, the screen saver can include a static image. As another example, the screen saver can include dynamic elements that move on the display in a preordained manner. For example, a screen saver element can include a geometric form that moves across the display and bounces from the sides of the display. As another example, a screen saver element can include an animated animal traversing a background (e.g., a fish swimming across an underwater image). These screen savers, however, do not vary—the elements always move in the same manner, and the color scheme used for the screen saver evolves in a predictable and preordained sequence.

SUMMARY OF THE INVENTION

This is directed to systems, methods and computer-readable media for displaying dynamic tags or screen savers that change based on detected characteristics of the user's environment. In particular, this is directed to dynamic tags that can serve as a fashion accessory by changing based on characteristics of the user's environment.

In some embodiments, an electronic device can include a display on which different types of information can be displayed. When the display or the device is not in use (e.g., after a particular period of inactivity), the electronic device can enable a screen saver or tag mode. In this mode, the electronic device can display a screen saver or tag that may include dynamic elements. In particular, to enhance the appeal of the tag, one or more tag elements, or one or more characteristics of the tag display can vary based on the output of sensors detecting attributes of the device environment.

The electronic device can include any suitable type of sensor. For example, the electronic device can include motion sensing components. As another example, the electronic device can include a microphone. As still another example, the electronic device can include a camera. One or more characteristics of the tag can be tied or correlated with the output of the sensors. For example, the direction or speed of motion of an element in the tag can be related to the motion of the electronic device as detected by the motion sensing components. As another example, the color palette or color scheme selected for a particular tag can be selected based on the colors of the environment detected by a camera. To enhance the aesthetic appeal of the electronic device as a fashion accessory, the color palette selected for the tag can be selected to match or complement the colors worn by the user or present in the user's environment.

To ensure that the displayed tag remains of interest to the user, the electronic device can dynamically change the appearance of the tag based on the evolution of the sensor outputs. For example, if the electronic device determines from the camera that the color schemes of the user's room have changed, the displayed tag can adjust to reflect the new detected colors. As another example, the electronic device can monitor the orientation of the device relative to the earth using a motion sensing component to ensure that a tag element moves in a manner oriented relative to the earth, and not relative to the display orientation.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
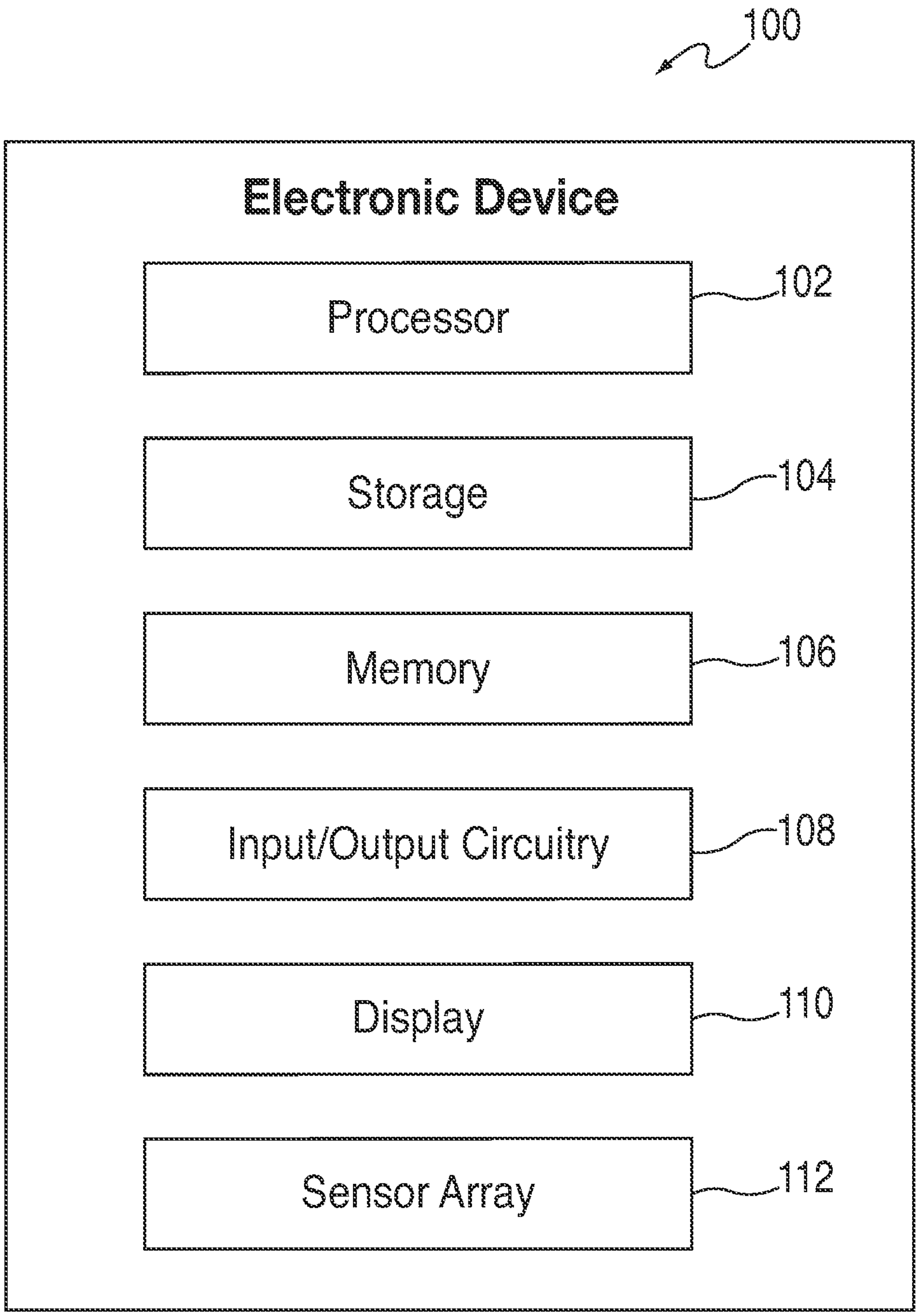
FIG. 1 is a schematic view of an illustrative electronic device that can display a screen saver or tag in accordance with one embodiment of the invention.

This is directed to systems and methods for displaying a dynamically changing screen saver or tag based on detected attributes of the device environment. A device can determine the manner in which to modify the displayed tag based on environmental attributes or characteristic properties in any suitable manner. For example, the device can change the direction, speed, and color of elements displayed in a tag or can adjust the number, type and distribution of elements within a tag. In some embodiments, the device can define specifically the manner in which tag characteristics relate to environmental attributes. For example, a user can define what aspects of a tag's display may change in response to a change in a characteristic property of the environment, and the manner in which they change.

To obtain information about an environment, the device can monitor the environment, for example by receiving a signal from any suitable sensor or circuitry coupled to or associated with the device. For example, the device can monitor an environment by receiving a signal from an accelerometer, camera, microphone, magnetic sensor, thermometer, hygrometer (e.g., a humidity sensor), physiological sensor, any other suitable sensor or circuitry, or any combination thereof. In some embodiments, the device can monitor an environment by receiving a signal from a user (e.g., a user input). For example, a system can monitor an environment by receiving a user input that represents one or more conditions of the environment. In some embodiments, a system can monitor an environment by receiving a signal from one or more devices. For example, a system can receive a signal from one or more devices through a communications network.

Monitoring the environment can include identifying one or more characteristic properties of the environment. For example, the device can analyze a received signal to identify a characteristic property of the environment, which can include, for example, an ambient property of the environment, such as vibrations, light (e.g., ambient light levels or average color), sound, magnetic fields, temperature, humidity, barometric pressure, any other suitable ambient property or any combination thereof. In some embodiments, a characteristic property may be based on an environment's occupants, such as the user of the device. For example, a characteristic property can be based on the number, movement, or characteristics of people or devices in an environment, any other feature of the environment's occupants, or any combination thereof.

The device can control any characteristic of the tag based on the characteristic property. For example, the device can adjust the color scheme of a displayed tag based on the properties of the environment. As another example, the device can adjust the direction of motion of a moving element within the tag. As still another example, the device can adjust the speed at which an element moves within the tag. In some embodiments, the number of elements or types of elements displayed in a tag can vary or be associated with an environment property.

FIG. 1 is a schematic view of an illustrative electronic device that can display a screen saver or tag in accordance with one embodiment of the invention. Electronic device 100 can include any suitable type of electronic device operative to display information to a user. For example, electronic device 100 can include a media player such as an iPod® available by Apple Inc., of Cupertino, California, a cellular telephone, a personal e-mail or messaging device (e.g., a Blackberry® or a Sidekick®), an iPhone® available from Apple Inc., pocket-sized personal computers, personal digital assistants (PDAs), a laptop computer, a tablet, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108 and display 110 as typically found in an electronic device of the type of electronic device 100, and operative to enable any of the uses expected from an electronic device of the type of electronic device 100 (e.g., connect to a host device for power or data transfers). In some embodiments, one or more of electronic device components 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Using instructions retrieved, for example from memory, control circuitry 102 can control the reception and manipulation of input and output data between components of electronic device 100. Control circuitry 102 can be implemented on a single-chip, multiple chips or multiple electrical components. For example, various architectures can be used for processor 56, including dedicated or embedded processor, single purpose processor, controller, ASIC, and so forth.

Storage 104 can include, for example, one or more storage mediums including a hard-drive, solid state drive, flash memory, permanent memory such as ROM, any other suitable type of storage component, or any combination thereof. In some embodiments, storage 104 can include a removable storage medium and loaded or installed onto electronic device 100 when needed. Removable storage mediums include, for example, CD-ROM, PC-CARD, memory card, floppy disk, magnetic tape, and a network component. Memory 106 can include cache memory, semi-permanent memory such as RAM, and/or one or more different types of memory used for temporarily storing data. In some embodiments, memory 106 and storage 104 can be combined as a single storage medium.

Input/output circuitry 108 can be operative to convert (and encode/decode, if necessary) analog signals and other signals into digital data. Input/output circuitry 108 can be coupled to or include any suitable input interface, such as for example, a button, keypad, dial, a click wheel, tap sensor (e.g., via an accelerometer), or a touch screen (e.g., using single or multipoint capacitive sensing, resistive sensing, surface acoustic wave sensing, pressure sensing, optical sensing, and the like), as well as any suitable output circuitry associated with output devices (e.g., audio outputs or display circuitry or components). In some embodiments, I/O circuitry 108 can be used to perform tracking and to make selections with respect to a UI on display 110, issue commands in device 100, or any other operation relating to detecting inputs or events from outside of the device and providing information describing the inputs or events to the device circuitry. In some embodiments, input/output circuitry 108 can interface with one or more sensors of the device, such as an accelerometer, ambient light sensor, magnetometer, magnetometer, IR receiver, microphone, thermostat, barometer, or other sensor can enable the UI orientation mode in response to detecting an environmental condition. In some embodiments, I/O circuitry 108 can include ports or other communications interfaces for interfacing with external devices or accessories (e.g., keyboards, printers, scanners, cameras, microphones, speakers, and the like).

Display 110 can be operatively coupled to control circuitry 102 for providing visual outputs to a user. Display 110 can include any suitable type of display, including for example a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display 110 can be configured to display a graphical user interface that can provide an easy to use interface between a user of the computer system and the operating system or application running thereon. The UI can represent programs, files and operational options with graphical images, objects, or vector representations, and can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith.

Sensor array 112 can include any suitable circuitry or sensor for monitoring an environment. For example, sensor array 112 can include one or more sensors integrated into a device, or coupled to the device via a remote interface (e.g., providing an output describing the environment via a wired or wireless connection). Sensor array 112 can include any suitable type of sensor, including for example a camera, microphone, thermometer, hygrometer, motion sensing component, positioning circuitry, physiological sensing component, proximity sensor, IR sensor, magnetometer, or any other type of sensor for detecting characteristics of a user or of the user's environment.

The camera can be operative to detect light in an environment. In some embodiments, the camera can be operative to capture images (e.g., digital images), detect the average intensity or color of ambient light in an environment, detect visible movement in an environment (e.g., the collective movement of a crowd), or detect or capture any other light from an environment. In some embodiments, the camera can include a lens and one or more sensors that generate electrical signals. The sensors of camera can be provided on a charge-coupled device (CCD) integrated circuit, for example. The camera can include dedicated image processing circuitry for converting signals from one or more sensors to a digital format, circuitry for pre-processing digital images before they are transmitted to other circuitry within device 100, or any other suitable circuitry.

The microphone can be operative to detect sound in an environment, such as sound from a particular source (e.g., a person speaking), ambient sound (e.g., crowd noise), or any other particular sound. The microphone can include any suitable type of sensor for detecting sound in an environment, including for example, a dynamic microphone, condenser microphone, piezoelectric microphone, MEMS (Micro Electro Mechanical System) microphone, or any other suitable type of microphone.

The thermometer can be operative to detect temperature in an environment (e.g., air temperate or the temperature of a medium in which the device is placed. In some embodiments, the thermometer can be used for detecting a user's body temperature (e.g., when an element of device 100 is placed in contact with the user, such as an headphone). The hygrometer can be operative to detect humidity in an environment (e.g., absolute humidity or humidity relative to a particular known level). The hygrometer can include any suitable type of sensor for detecting humidity in an environment.

The motion sensing component can be operative to detect movement of electronic device 100. In some embodiments, the motion sensing component can be sufficiently precise to detect vibrations in the device's environment, for example vibrations representative of the movement of people in the environment. For example, each person may be dancing and their footfalls may create vibrations detectable by the motion sensing component. Alternatively, the motion sensing component can provide an output describing the movement of the device relative to the environment (e.g., the orientation of the device, or shaking or other specific movements of the device by the user). The motion sensing component can include any suitable type of sensor for detecting the movement of device 100. For example, the motion sensing component can include one or more three-axes acceleration motion sensing components (e.g., an accelerometer) operative to detect linear acceleration in three directions (i.e., the x or left/right direction, the y or up/down direction, and the z or forward/backward direction). As another example, the motion sensing component can include one or more two-axis acceleration motion sensing components which can be operative to detect linear acceleration only along each of x or left/right and y or up/down directions (or any other pair of directions). In some embodiments, the motion sensing component can include an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer. In some embodiments, the motion sensing component can include rotational sensor (e.g., a gyroscope).

The positioning circuitry can be operative to determine the current position of electronic device 100. In some embodiments, the positioning circuitry can be operative to update the current position at any suitable rate, including at relatively high rates to provide an estimation of movement (e.g., speed and distance traveled). The positioning circuitry can include any suitable sensor for detecting the position of device 100. In some embodiments, the positioning circuitry can include a global positioning system ("GPS") receiver for accessing a GPS application function call that returns the geographic coordinates (i.e., the geographic location) of the device. The geographic coordinates can be fundamentally, alternatively, or additionally derived from any suitable trilateration or triangulation technique. For example, the device can determine its location using various measurements (e.g., signal-to-noise ratio ("SNR") or signal strength) of a network signal (e.g., a cellular telephone network signal) associated with the device. Instead or in addition, the positioning circuitry can determine the location of the device based on a wireless network or access point that is in range or a wireless network or access point to which the device is currently connected.

The physiological sensing component can be operative to detect one or more physiological metrics of a user. In some embodiments, the physiological sensing component may be operative to detect one or more physiological metrics of a user operating device 100. The physiological sensing component can include any suitable sensor for detecting a physiological metric of a user, including for example a sensor operative to detect a user's heart rate, pulse waveform, breathing rate, blood-oxygen content, galvanic skin response, temperature, heat flux, any other suitable physiological metric, or any combination thereof. Such sensors can include, for example, a heart rate sensor, a pulse waveform sensor, a respiration sensor, a galvanic skin response sensor, a temperature sensor (e.g., an infrared photodetector), an optical sensor (e.g., a visible or infrared light source and photodetector), any other suitable physiological sensor, or any combination thereof. In some embodiments, the physiological sensing component may include one or more electrical contacts for electrically coupling with a user's body. Such sensors can be exposed to the external environment or disposed under an electrically, optically, and/or thermally conductive material so that the contact can obtain physiological signals through the material.

In some embodiments, electronic device 100 can include a bus operative to provide a data transfer path for transferring data to, from, or between control processor 102, storage 104, memory 106, input/output circuitry 108, display 110, sensor array 112, and any other component included in the electronic device.

Figure 2:
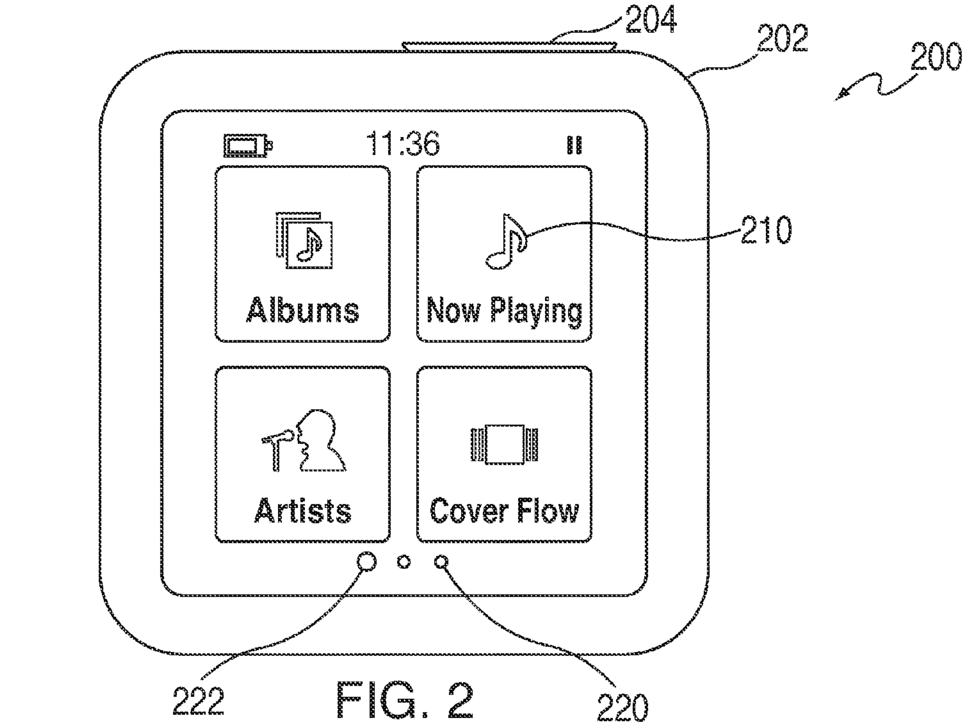
FIG. 2 is a schematic view an illustrative user interface for interacting with an electronic device in accordance with one embodiment of the invention.

Using an electronic device, a user can display any suitable information on the device display. For example, the electronic device can display images, objects, documents, or any other suitable information. FIG. 2 is a schematic view an illustrative user interface for interacting with an electronic device in accordance with one embodiment of the invention. Display 200 can include options 210 displayed on one of several available screens. The displayed options 210 can identify operations that the user can direct the device to perform using any suitable approach, including for example via one or more of icons or images, text, buttons, or other display features. Display 200 can include several pages of options 210. In one implementation, display 200 can identify several available pages using markers 220, and identify the currently displayed page by differentiating one of the markers 220 (e.g., marker 222 is highlighted). Display 200 can have any suitable orientation relative to device 202. In the example of FIG. 2, display 200 is aligned with device 202 (e.g., such that the top of display 200 is adjacent to button 204 of electronic device 202).

When the user is not providing particular instructions to the device, or the user is not viewing information or content displayed by the device, the user may not need to see selectable options displayed on display 200. In addition, the accessibility of the options on the display may allow a user to accidentally select a displayed option and direct the device to perform an undesired operation. To prevent this, the electronic device can turn off display 200, and instead provide a blank or dark display. This approach also reduces the amount of power used by the device, as the display may not require any power.

Figure 3:
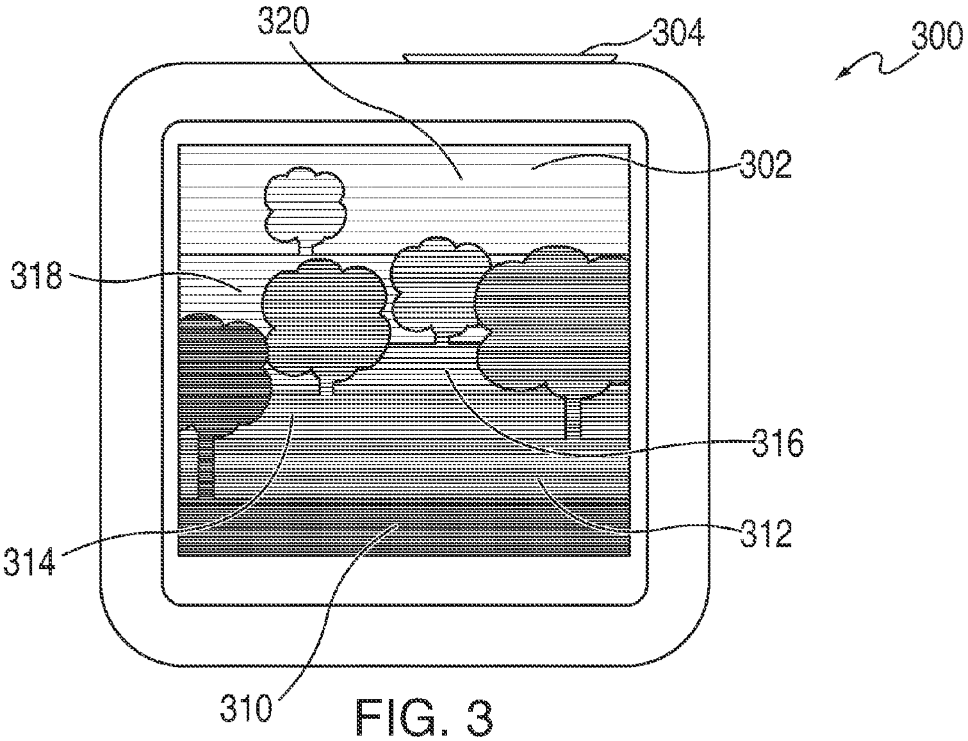
FIG. 3 is a schematic view of an illustrative screen saver to be displayed by the device in accordance with one embodiment of the invention.

While this approach can be effective, the resulting device may not be aesthetically pleasing. In particular, if the device is exposed by the user, for example when it is worn as an accessory (e.g., attached to the user's clothing by an integrated clip), the dark screen of the device may not integrate well with the user's appearance. In some embodiments, the electronic device can instead display a screen saver or other content that does not include any selectable options. The displayed content can include a static image, or instead an animation. FIG. 3 is a schematic view of an illustrative screen saver to be displayed by the device in accordance with one embodiment of the invention. Display 300 can include screen saver 302. The screen saver can include any suitable content, including for example dynamic or moving content. In one implementation, screen saver 302 can include several static layers 310, 312, 314, 316 and 318 that move relative to each other over background 320. Each layer can be distinguished from other layers using any suitable approach, including for example by using different color palettes or color schemes for each layer. In the implementation of screen saver 300, each of layers 310, 312, 314, 316 and 318 can be different greens (e.g., going from darkest to lightest). In another approach, each layer could be a different color or in a different palette (e.g., blue, green, red and purple layers).

The layers can move relative to each other using any suitable approach. In some embodiments, the layers can move at the same, different, or related speeds. For example, each of layers 310, 312, 314, 316 and 318 (and background 320) can move at the same speed (but in different directions). As another example, each of the layers can be associated with a particular speed. As still another example, each layer can move at a speed that is a multiple of a default or basic speed (e.g., whole number multiples, rational number multiples, or any suitable real number multiple of the speed). The particular multiple selected for each layer, or any other variable defining the layer speed can be preset or defined by a developer of the tag or screen saver. Alternatively, the multiple selected for each layer, or any other variable defining the layer speed can be selected by a user.

In some embodiments, the layers can all move along one or more axes at different speeds (e.g., all of the layers move from left to right or right to left on the display). Alternatively, each layer can move in a particular direction defined for that layer or remain immobile. For example, layer 310 can be static, layer 310 can be static, layer 312 can move from left to right, layer 314 can move from top to bottom, layer 316 can move at a 45 degree angle, and layer 318 can move from right to left. The particular direction at which each layer moves can be defined using any suitable approach. In some embodiments, the direction can be selected by the developer or writer of the tag or screen saver. In other embodiments, the particular directions can be user defined. In still other embodiments, the direction of movement for each layer can vary, for example based on the output of one or more sensors of the electronic device.

Figure 4:
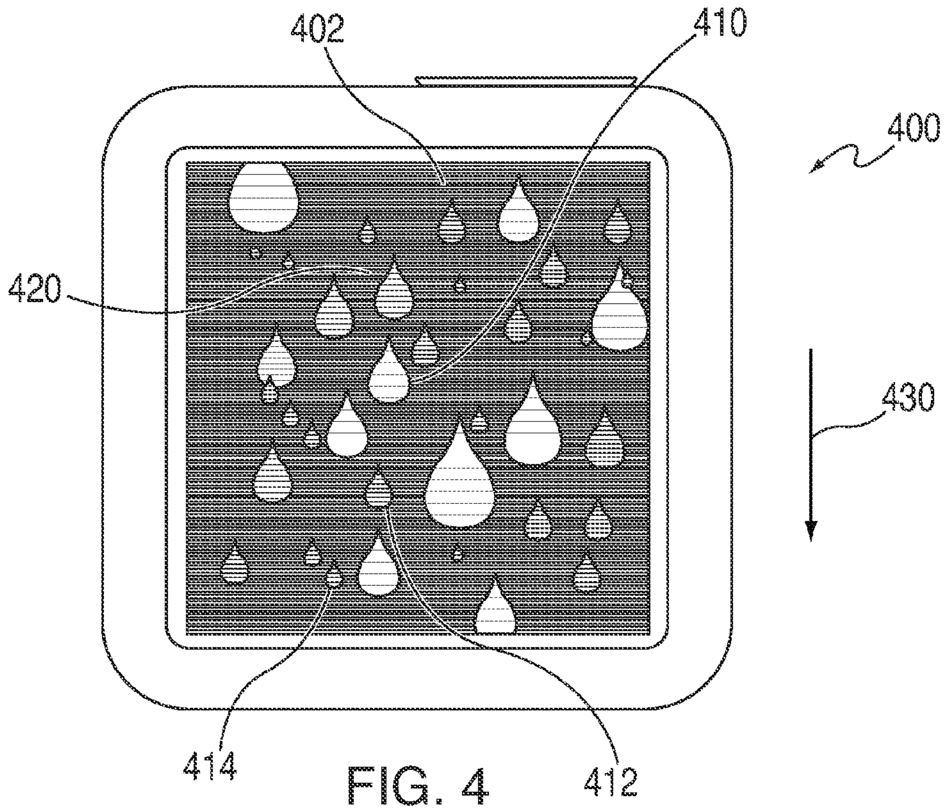
FIG. 4 is a schematic view of an electronic device display in which a dynamic screen saver is displayed.
Figure 5:
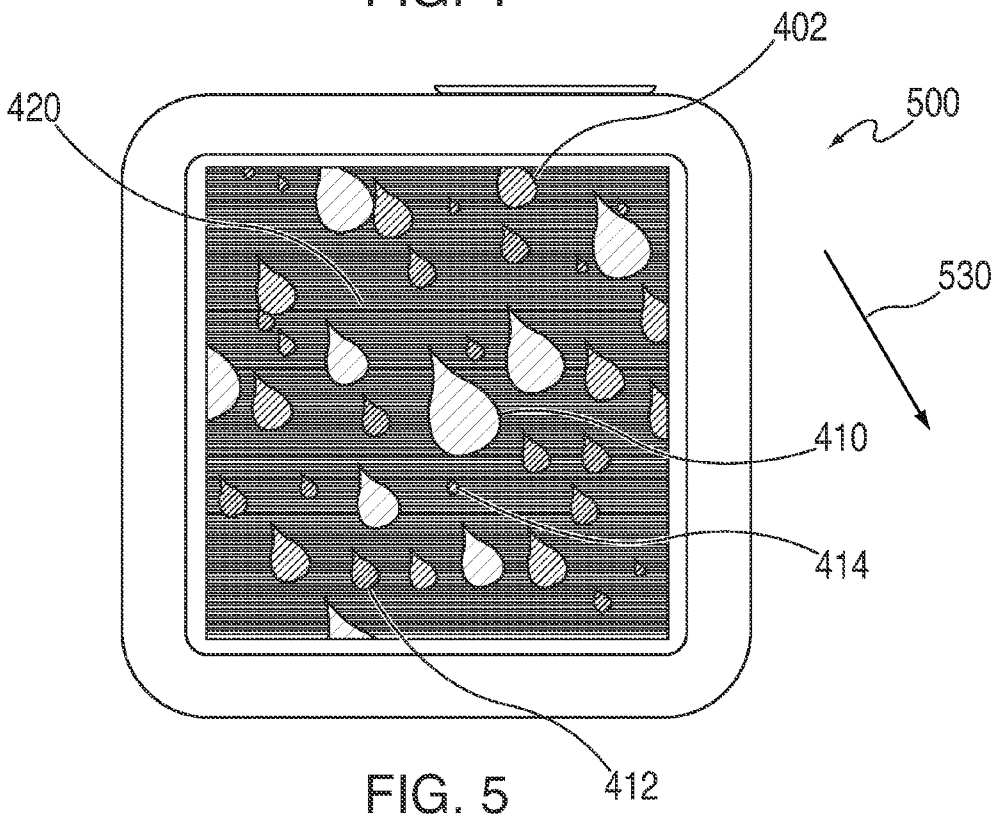
FIG. 5 is a schematic view of the dynamic screen saver of FIG. 4 after detecting a change in device orientation in accordance with one embodiment of the invention.

FIG. 4 is a schematic view of an electronic device display in which a dynamic screen saver is displayed. FIG. 5 is a schematic view of the dynamic screen saver of FIG. 4 after detecting a change in device orientation in accordance with one embodiment of the invention. Display 400 can include dynamic screen saver 402. Screen saver 402 can include background 420 over which several layers of raindrops move. In particular, screen saver 402 can include layers 410, 412 and 414. Each layer can be distinguished from the other layers using any suitable approach. For example, each layer 410, 412 and 414 can include one or both of varying color schemes, varying element types, varying element sizes, and varying element density. In particular, layer 410 can include large white raindrops, layer 412 can include medium sized light blue raindrops, and layer 414 can include small turquoise raindrops. The particular colors selected for the layers can be such that the colors range from white to different shades of blue that progressively approach the color of background 420. Although only three layers were identified in screen saver 402, it will be understood that screen saver 402 can include any suitable number of layers, and in particular layers for each size and color scheme of the displayed elements. In some embodiments, each individual element (e.g., each raindrop) can be associated with an individual layer.

The elements of each of layers 410, 412 and 414 can move in any suitable direction and at any suitable speed. For example, and as described above in connection with FIG. 3, each layer can move in the same or different directions, and at the same or different speeds. In some embodiments, one or more of the direction and speeds can be determined from the output of one or more sensors associated with the electronic device. FIGS. 4 and 5 will be used to illustrate a particular implementation in which the direction of movement is related to the output of a motions sensing component. As shown in FIG. 4, the elements of each layer 410, 412 and 414 move in direction 430 (e.g., vertically). In FIG. 5, the elements of the same layers move in direction 530, which is at an angle relative to direction 430. The particular change in angle between directions 430 and 530 can be determined based on the output of a motion sensing component. In particular, the motion sensing component can determine the angle of the device relative to the gravity vector, and change the direction of the layer movement to match the gravity vector. In FIG. 4, therefore, the electronic device is oriented along the gravity vector (i.e., the deice is straight). In FIG. 5, however, the electronic device has been rotated relative to the gravity vector such that the gravity vector is line with direction 530 (i.e., the electronic device is tilted). This approach can provide a realistic animation by which the rain of the screen saver falls towards the ground, and not away from the ground even when the device is tilted.

In some embodiments, the speed at which the rain drops of each of the layers move can be determined by a particular sensor output. For example, the speed can be associated with a motion sensing component output. In particular, if the device is shaken or detects a series of peaks of movement, the electronic device can vary the speed at which one or more layers moves (e.g., accelerate the raindrop speed in response to detecting shaking). As another example, the speed of movement of the layers can be determined from the output of a different sensor. In one implementation, the speed of the layers can be related to the volume of ambient noise detected by a microphone (e.g., the speed of the layers can increase with the detected volume). The electronic device can define the correlation between volume and speed using any suitable approach. For example, the electronic device can define a linear correlation or a non-linear but smooth correlation (e.g., defined as a curve or as a table with volume levels and associated speeds). As another example, the electronic device can define a series of steps by which a particular speed is associated with a range of detected volumes.

Generally, the speed and direction of the movement of one or more elements in one or more layers can be associated with the output of any sensor. For example, the direction of movement for each layer can be associated with a different sensor output, while the speed can be associated with a single sensor output. As another example, one or both of the direction of movement and the speed of movement can be associated with a single sensor output, but using different correlations between the directions and/or speeds and the output. In particular, the speed of a first layer can be related to the sensor output by a linear correlation, while the speed of a second layer can be related to the same sensor output by a different linear correlation or by a non-linear correlation.

In some embodiments, the speed or direction of the layer movement can be related to properties of the device environment that are not identified from sensor outputs. For example, the speed or movement can be related to local weather information that is retrieved from a remote source in response to providing the current location of the device to the remote source. As another example, the movement characteristics can be related to local news information determined from the current time and location of the device. The properties of the device environment can be determined from any suitable source in response to receiving the device location. The source can be selected by a screen saver developer, or instead or in addition selected by the user. The source can include a dedicated source (e.g., a server dedicated to providing weather information), or a source that aggregates information from other sources (e.g., a search engine providing search results based on particular location criteria).

Although the preceding discussion described the correlation between sensor outputs and the speed and direction of movement of elements of the screen saver, it will be understood that any characteristic of the screen saver can be correlated to a sensor output. For example, the color scheme, the number of elements, the size of the elements, the number of layers, the changes or variations of the screen saver over time, or any other characteristic of the screen saver can be tied to a particular sensor output.

Figure 6:
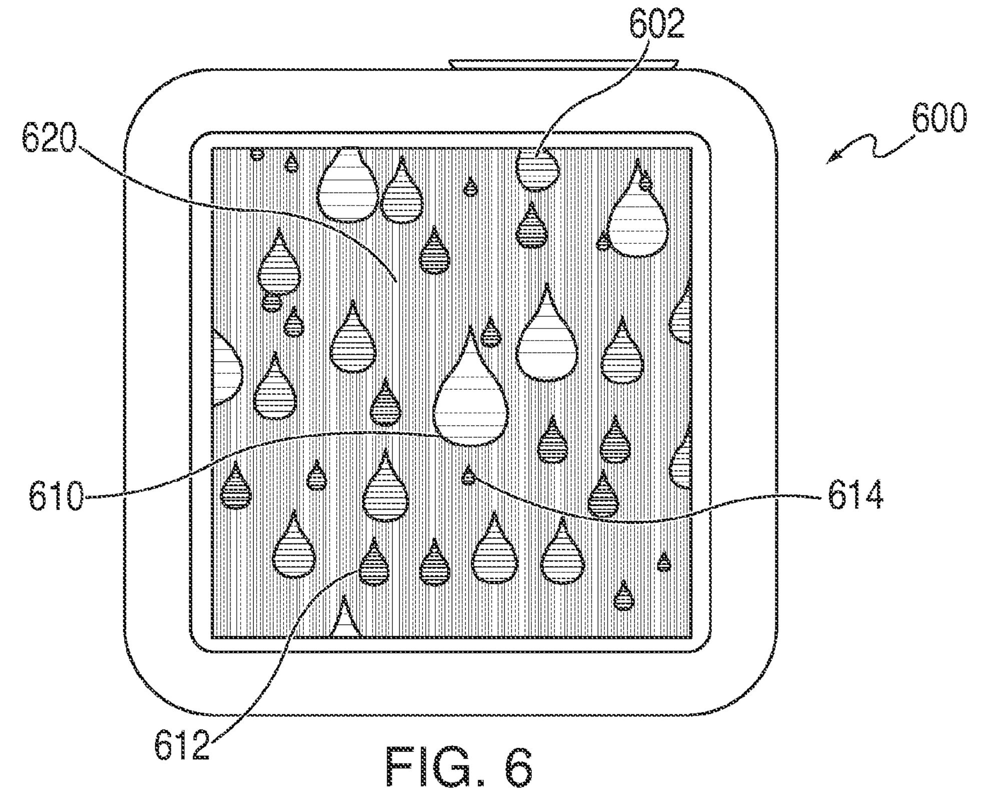
FIG. 6 is a schematic view of the screen saver of FIG. 4 in a different color palette in accordance with one embodiment of the invention.

In some embodiments, the screen saver or tag may serve as a fashion accessory for the user. To ensure that the tag matches the user's clothing, the electronic device can adjust the color palette used for the tag based on the color palette of clothing or accessories worn by the user. FIG. 6 is a schematic view of the screen saver of FIG. 4 in a different color palette in accordance with one embodiment of the invention. Display 600 can include dynamic screen saver 602, which can include layers 610, 612 and 614 over background 620. In contrast with dynamic screen saver 402 (FIG. 4), which was substantially blue, dynamic screen saver 602 can be substantially purple. Dynamic screen saver 602 could have any suitable color palette, including for example a mix of several palettes (e.g., layers that are both from a blue color palette and a purple color palette). Alternatively, the color palette used from the dynamic screen saver could vary over time.

The electronic device can use any suitable approach for determining a desired color palette. For example, a user can select a color palette or a particular color from which to define a color palette. In one implementation, the user could change the color palette of a particular tag by providing a corresponding input (e.g., a circular motion on a touch screen to scroll through all available color schemes). As another example, the electronic device can automatically select a color palette. To ensure that the device picks a color palette that is appropriate, a camera of the device can be used to capture an image of the clothing the user is wearing (e.g., after prompting the user to capture an image of the user's clothing). The electronic device can analyze a captured image to identify one or more primary colors or color schemes associated with the user's clothing, and pick a color palette that includes a color from the identified color schemes, matches the identified color schemes, or is complimentary to an identified color scheme. For example, if the electronic device determines from a captured image that the user is wearing blue clothing with a few brown accessories, or blue and brown clothing, the electronic device can select a brown color scheme for the dynamic screen saver. In some embodiments, the electronic device can instead or in addition select a color palette based on the colors of clothing and accessories worn by other users. For example, the device can select a color palette corresponding to the clothing of another user, such as a friend (e.g., as a mark of friendship or of a relationship with the friend).

In some embodiments, some of the screen savers or tags may only have a single color scheme. In particular, the screen savers can be so complex, or alternatively so simple that only a default color scheme is available. In such cases, the electronic device can determine whether the user's clothing and accessories match the default color scheme before selecting or proposing the screen saver or tag.

Instead of matching the screen saver color scheme with the user's clothing or accessories, the electronic device can match the color scheme with the colors of the user's environment. In particular, the electronic device can capture an image of the user's environment and identify one or more colors from which to base a color scheme. The electronic device can then adjust the color palette of a selected screen saver or select a new screen saver that matches the identified colors. In some embodiments, the color scheme used, the screen saver selected, or both can vary with time as the color scheme of the user's environment changes (e.g., the user moves from indoors to outside, or changes rooms within a building). To avoid over-frequent changing of the tag, the electronic device can capture and analyze images of the user's environment at predefined intervals. Alternatively, the electronic device can only change the color scheme or screen saver in response to detecting a substantial change in color of the environment (e.g., ignore small changes in color). As another alternative, the electronic device can define one or more available color schemes, and only change the displayed tag when the environment matches one of the available color schemes.

Figure 7:
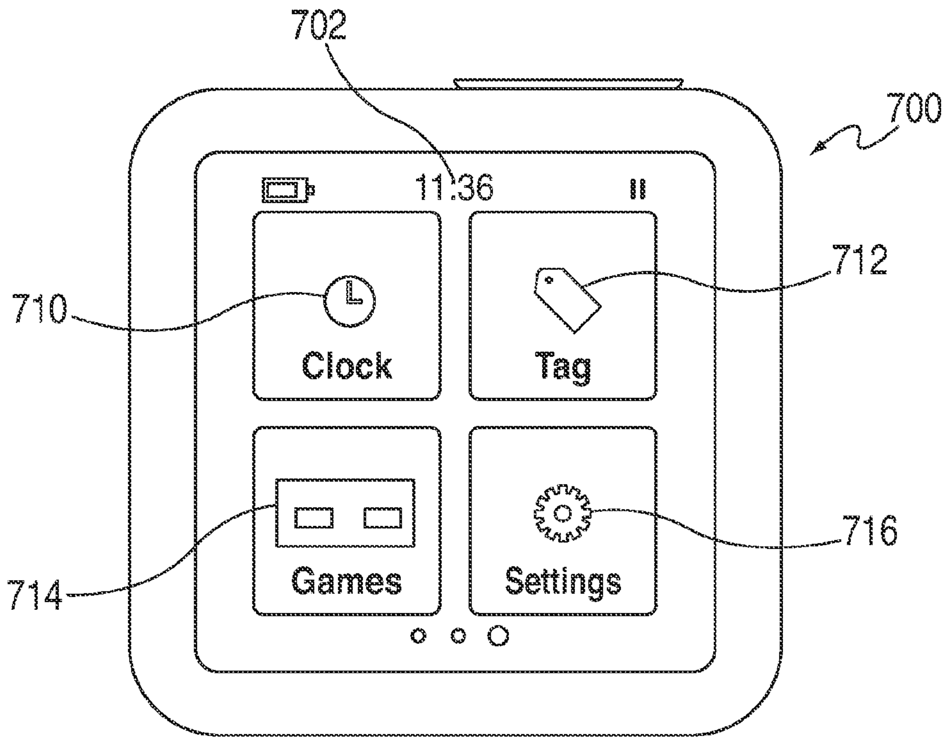
FIG. 7 is a schematic view of an illustrative interface for accessing a tag selection menu in accordance with one embodiment of the invention.
Figure 8:
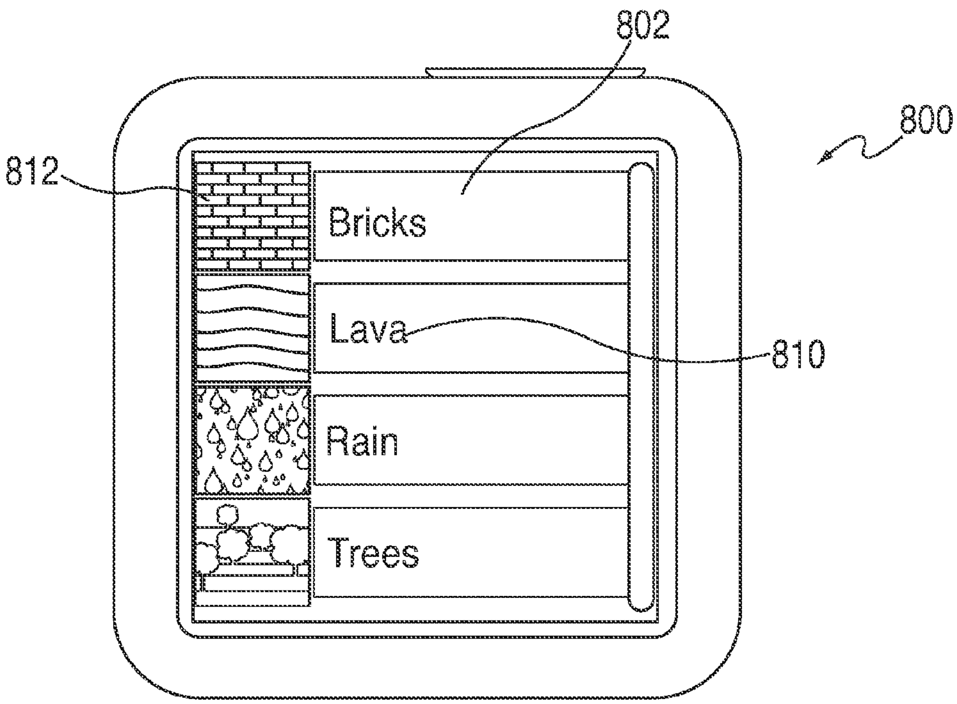
FIG. 8 is a schematic view of an illustrative tag listing in accordance with one embodiment of the invention.

The particular tag used can be selected using any suitable approach. In some embodiments, the device can automatically select a tag (e.g., based on a random selection, or based on a particular sensor output). Alternatively, the user can select a particular tag to use. FIG. 7 is a schematic view of an illustrative interface for accessing a tag selection menu in accordance with one embodiment of the invention. Display 700 can include some or all of the features of display 200 (FIG. 2). In particular, display 700 can include several options 710, 712, 714 and 716. Among the options, option 712 can be selected to access a tag menu, and option 716 can be elected to access a settings menu. In response to receiving a user selection of option 712, the electronic device can display a listing of available tags. FIG. 8 is a schematic view of an illustrative tag listing in accordance with one embodiment of the invention. Display 800 can include listing 802 of available tags. Each tag can be identified by title 810 and icon 812. The icon can serve as a screen shot providing a preview of the tag.

In response to receiving a user selection of a particular tag (e.g., of a listing 810), the electronic device can display the tag in full screen for the user to preview. The user can then end the preview by providing any suitable input to the device. The preview can vary the tag appearance based on the sensor outputs of the device (e.g., vary the color scheme based on a captured image) so that the user can adequately preview the appearance of the device. In some embodiments, the electronic device can instead or in addition access a settings display for settings associated with the selected tag. The user can access the settings display using any suitable approach, including for example by selecting settings option 716 (FIG. 7).

Figure 9:
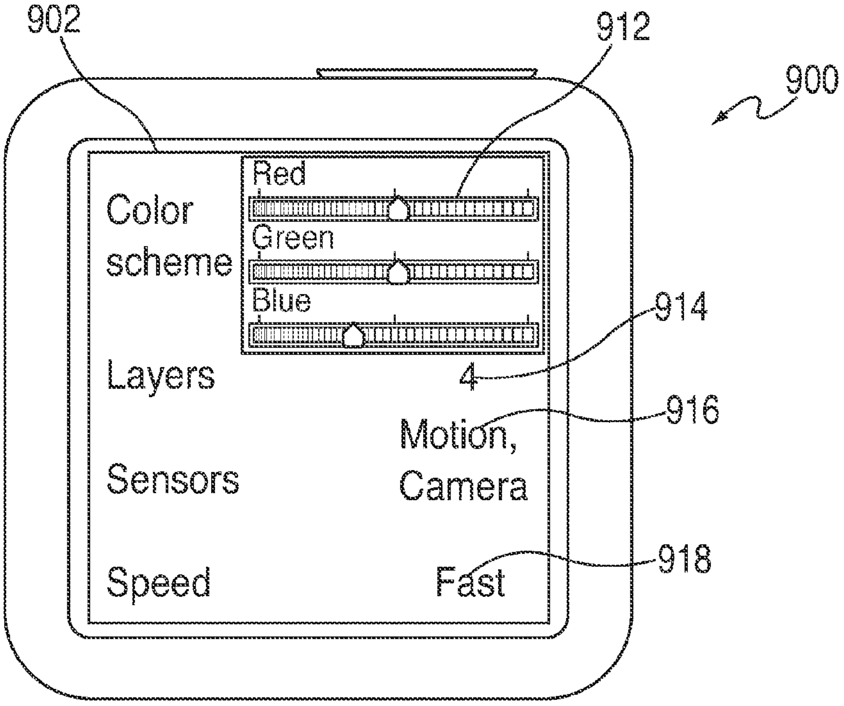
FIG. 9 is a schematic view of an illustrative display for define settings associated with a selected tag in accordance with one embodiment of the invention.

FIG. 9 is a schematic view of an illustrative display for define settings associated with a selected tag in accordance with one embodiment of the invention. Display 900 can include listing 902 of options associated with a selected tag. In particular, listing 902 can include color scheme option 912, layers option 914, sensors option 916, and speed option 918. The user can select color scheme option 912 to define the particular color scheme to use for a tag. In some embodiments, the user can select a particular color scheme for individual layers of a tag. The user can define the color scheme using any suitable approach, including for example by selecting a range of colors, a base color, or defining the criteria used to select colors (e.g., camera output). In the example of FIG. 9, a user can select a base color by adjusting red, green and blue sliders.

The user can select layers option 914 to define the number of layers to include in the tag. In response to selecting layers option 914, the electronic device can display a wheel or keypad from which the user can select the number of layers. In some embodiments, the user can also define particular elements to include in each layer using layers option 914. For example, the user can define the number of elements, the types of elements (e.g., types of trees), the size of elements, or any other attribute defining the manner in which an element is included in a layer.

The user can select sensors option 916 to select the particular sensors used to control the manner in which the selected tag moves. In particular, the user can select which sensors to associate with particular layers, and the manner in which the sensor output is associated with a characteristic of the tag or layer movement, as described in more detail below in connection with FIG. 10.

The user can select speed option 918 to define the speed at which the tag changes. For example, the electronic device can define the speed at which individual layers move. As another example, the electronic device can define the speed at which the tag changes characteristics (e.g., changes color schemes) or adjusts a display property. Display 900 can include any other suitable option, including for example options defining the direction of the movement, the manner in which tag elements move (e.g., constant or variable rates), or any other property or characteristic of the tag. The user can return to the previous menu using any suitable approach, including for example a particular touch motion on a touch screen (e.g., swipe back motion).

Figure 10:
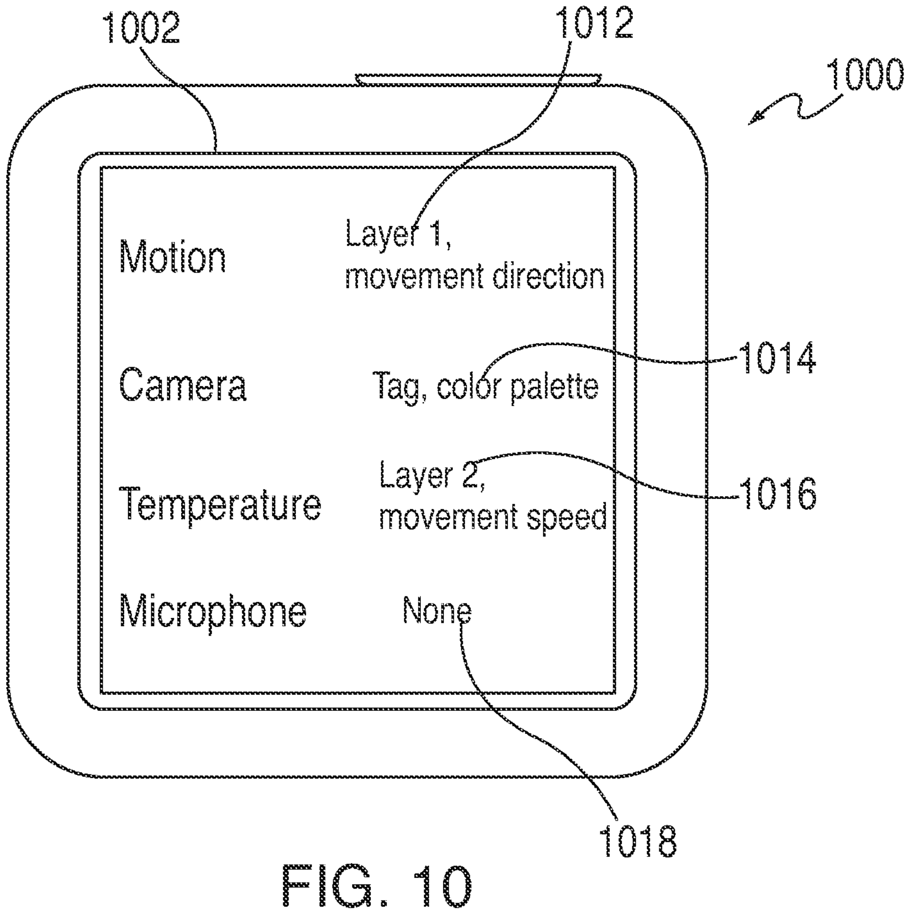
FIG. 10 is a schematic view of an illustrative display for associating sensor outputs with tag characteristics in accordance with one embodiment of the invention.

In some embodiments, a user can define the associations between particular sensor outputs and the characteristics of a displayed tag. FIG. 10 is a schematic view of an illustrative display for associating sensor outputs with tag characteristics in accordance with one embodiment of the invention. A user can access display 1000 using any suitable approach, including for example by selecting settings option 716 (FIG. 7) or in response to selecting sensors option 916 (FIG. 9). Display 1000 can include listing 1002 of selectable options for correlating sensor outputs to characteristics of a tag display. In some embodiments, each tag can have a distinct display 1000 defining its settings, or a single sensor setting can be applied to all of the tags. The user can therefore select a particular tag, and subsequently access display 1000 associated with the selected tag. Listing 1002 can include any suitable option, including motion option 1012, camera option 1014, temperature option 106 and microphone option 1016. Each option can be associated with a particular sensor from the sensor array. Accordingly, a user can scroll listing 1002 to access options associated with other sensors.

A user can select motion option 1012 to define the tag characteristic associated with the output of a motion sensing component. In the example of FIG. 10, the motion sensing component output is associated with Layer 1 of the tag, and the movement direction of that layer. In some embodiments, the user can further define the specific correlation between the motion sensing component output and the movement direction (e.g., by selecting option 1012 to define a particular curve or correlation between the sensor output and the movement direction).

A user can select camera option 1014 to define the tag characteristic associated with the images captured by the camera. In the example of FIG. 10, the camera output is associated with the color palette of the entire tag. In some embodiments, the user can further define the specific correlation between captured images and the color palette (e.g., by selecting option 1012). In some embodiments, a particular sensor may have a limited number of tag characteristics with which it can be associated. For example, a camera may be limited to color related tag characteristics. Option 1014 can therefore restrict the available characteristics that the user can select for the camera output.

A user can select temperature option 1014 to define the tag characteristic associated with the ambient temperature of the device. The ambient temperature can be determined from a thermometer associated with the device, or alternatively by retrieving temperature information from a remote source (e.g., a weather station). The electronic device can provide location and time information to the remote source, and receive the current temperature for the location at the provided time from the source. In the example of FIG. 10, the temperature is associated with the speed of the movement of layer 2 of the tag. The user can further define the specific correlation between the movement speed and the temperature using any suitable approach (e.g., by selecting option 1014 to define a particular curve or correlation between the sensor output and the movement speed.

A user can select microphone option 1016 to define he tag characteristic associated with the ambient noise or sounds detected by a microphone. In some embodiments, however, a user may wish to ignore the output of a particular sensor. Accordingly, the user can select that no tag characteristic is associated with the sensor. In the example of FIG. 10, the microphone output is not associated with any tag characteristic.

In some cases, it may be difficult to partially or fully associate sensor outputs with tag characteristics on the electronic device. In particular, if the electronic device has a small screen, the user may have difficulty navigating menus and selecting particular desired options. To alleviate this difficulty, a user can define the relationships between a tag and sensor outputs using a host device having a larger screen and a more expansive user interface. For example, a user can use a computer having a keyboard. Once the tag-sensor correlations have been defined, they can be transferred to the electronic device using a wired or wireless connection (e.g., via iTunes, available from Apple Inc.). In some embodiments, a user can define an entire tag or screen saver (e.g., layers and elements, movement and speed, colors) using the host device, and provide the user-defined tag or screen saver to the electronic device.

To conserve battery power, the electronic device can selectively display the tags or screen savers. For example, the tags can be displayed intermittently at predetermined intervals (e.g., 5 seconds every minute).

As another example, the tags can be displayed in response to detecting a particular event (e.g., in response to a particular sensor output, such as movement of the device detected by a motion sensing component). As still another example, the electronic device can display the tags only in response to a user instruction (e.g., in response to a user start instruction) and continue displaying the tags until the user instructs otherwise or until a timer lapses (e.g., display 15 minutes following a user instruction). In some embodiments, a user may customize the conditions for display the tags, for example using a settings menu such as menu 1000 (FIG. 10).

Figure 11:
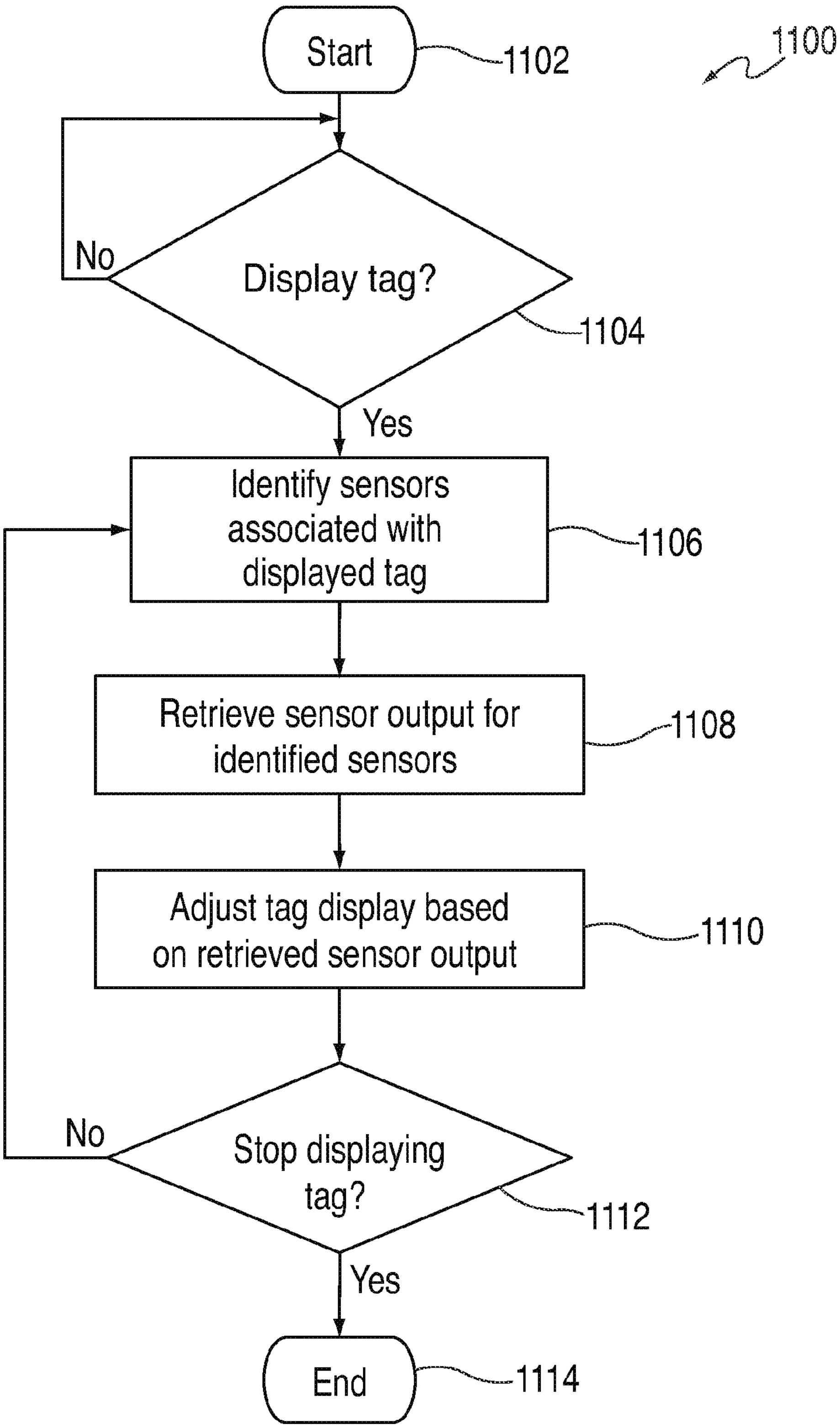
FIG. 11 is a flowchart of an illustrative process for displaying a dynamic screen saver in accordance with one embodiment of the invention.

FIG. 11 is a flowchart of an illustrative process for displaying a dynamic screen saver in accordance with one embodiment of the invention. Process 1100 can begin at step 1102. At step 1104, the electronic device can determine whether to display a tag or screen saver. For example, the electronic device can determine whether a timeout has lapsed for enabling a tag or screen saver mode. As another example, the electronic device can determine whether a user instruction to display a tag was received. If the electronic device determines that the tag should not be displayed, process 1100 returns to step 1104.

If, at step 1104, the electronic device instead determines that a tag should be displayed, process 1100 moves to step 1106. At step 1106, the electronic device can identify the sensors associated with the displayed tag. For example, the electronic device can identify the particular sensors used to control specific characteristics of the tag display. At step 1108, the electronic device can retrieve the sensor output for the identified sensors. For example, the electronic device can retrieve the output of the identified sensors and pass it to the tag display process.

At step 1110, the electronic device can adjust the tag display based on the retrieved sensor output. For example, the electronic device can determine the particular variation in a tag display characteristic that is associated with a sensor output, and direct the display circuitry to adjust the tag display by the amount of the particular variation. For example, the electronic device can adjust the direction of movement of a tag element, or the speed at which the element moves. Process 1100 can then move to step 1112, where it may determine whether or not to stop displaying the tag. For example, the electronic device can determine whether an instruction to exit the tag or screen saver mode was received. As another example, the electronic device can determine whether an instruction to perform an operation that requires other content to be displayed was received. If the electronic device determines that the tag should continue to be displayed, process 1100 can return to step 1106. Alternatively, if the electronic device determines that the tag should no longer be displayed, process 1100 can end at step 1114.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation, and the present invention is limited only by the claims which follow.

What is claimed is:

1. A method for displaying a dynamic tag, comprising:
displaying a tag in full screen on a device display, wherein the tag comprises at least two layers moving relative to one another on the display;
retrieving a sensor output characterizing an environment of the device;
identifying a relation between the retrieved sensor output and characteristics of the movement of each of the at least two layers; and
adjusting the movement of each of the at least two layers in response to identifying, wherein the sensor comprises at least one of a:
hygrometer;
physiological sensing component;
proximity sensor;
IR sensor; and
magnetometer.

2. The method defined in claim 1 wherein the sensor comprises the hygrometer and wherein adjusting the movement of each of the at least two layers comprises adjusting the movement of each of the at least two layers in response to humidity data captured with the hygrometer.

3. The method defined in claim 1 wherein the sensor comprises the physiological sensing component and wherein adjusting the movement of each of the at least two layers comprises adjusting the movement of each of the at least two layers in response to one or more physiological metrics of a user captured with the physiological sensing component.

4. The method defined in claim 1 wherein the sensor comprises the proximity sensor and wherein adjusting the movement of each of the at least two layers comprises adjusting the movement of each of the at least two layers in response to one or more proximity data captured with the proximity sensor.

5. The method defined in claim 1 wherein the sensor comprises the IR sensor and wherein adjusting the movement of each of the at least two layers comprises adjusting the movement of each of the at least two layers in response to IR sensor data captured with the IR sensor.

6. The method defined in claim 1 wherein the sensor comprises the magnetometer and wherein adjusting the movement of each of the at least two layers comprises adjusting the movement of each of the at least two layers in response to magnetic field data captured with the magnetometer.

* * * * *